Figure 1:
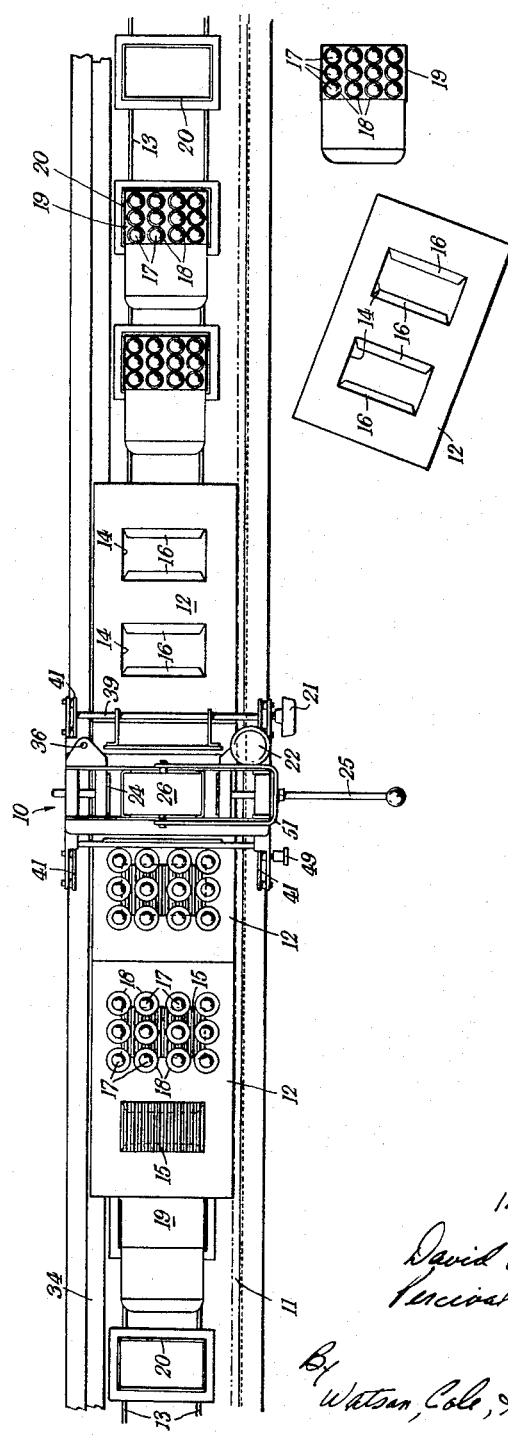

Sept. 26, 1961  D. C. MORTON ET AL  3,001,344
PACKAGING APPARATUS

Filed June 16, 1959  5 Sheets-Sheet 2

Fig. 2.

INVENTORS
David Charles Morton
Percival James Packman
BY Watson, Cole, Grindle & Watson
ATTORNEYS Sept. 26, 1961 D. C. MORTON ET AL 3,001,344
PACKAGING APPARATUS
Filed June 16, 1959 5 Sheets-Sheet 3

INVENTORS
David Charles Morton
Percival James Packman

By Watson, Cole, Grindle & Watson
ATTORNEYS

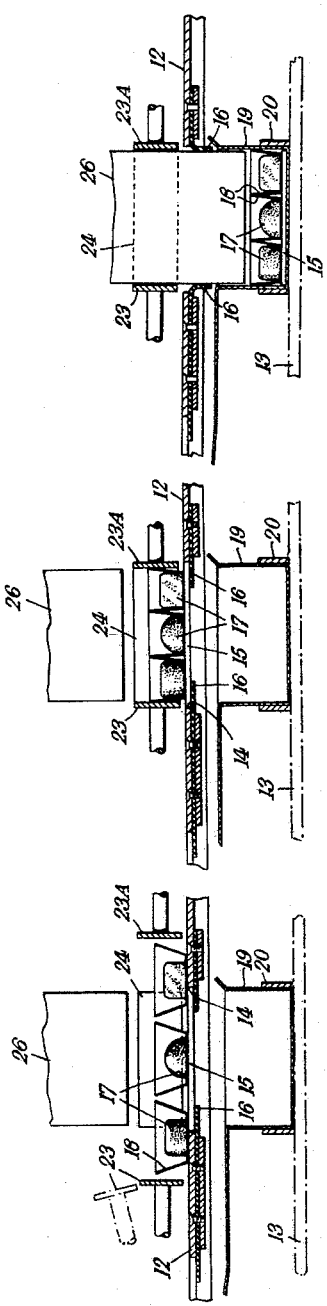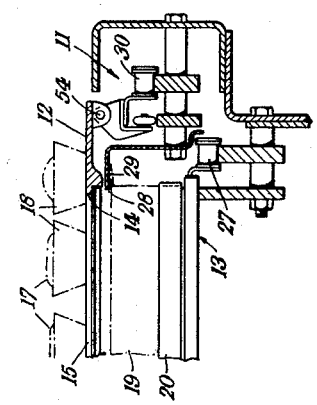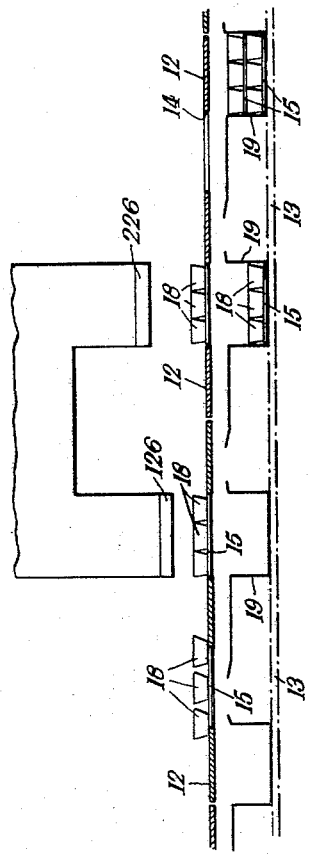

United States Patent Office 3,001,344
Patented Sept. 26, 1961

3,001,344
PACKAGING APPARATUS
David Charles Morton, Reading, and Percival James Packman, Twyford, England, assignors to The Forgrove Machinery Company Limited, Leeds, England, a company of Great Britain
Filed June 16, 1959, Ser. No. 820,789
7 Claims. (Cl. 53—124)

This invention relates to apparatus for packing into boxes, cartons or other containers, hereinafter termed boxes or the like, an assembly of articles, such for example as chocolates, sweets, biscuits or cakes, which is to form a layer in the box. The invention is particularly but not exclusively concerned with apparatus for packing into a box an assembly of such articles in which each article is contained in an individual corrugated cup made, for example, of corrugated paper.

The invention provides apparatus for packing into boxes or the like assemblies of articles to be packed, comprising an intermittently operable conveyor for feeding to a transfer station a succession of carriers, each having a recess in its upper surface, an aperture in the base of the recess and flexible leaves projecting inwardly from the periphery of the recess, the leaves serving to support a flat sheet carrying on its upper surface the assembly of articles to be packed and being capable of yielding to permit of downward passage of the sheet and the articles through the aperture, another intermittently operable conveyor situated at a lower level for feeding boxes in succession to the transfer station, and mechanism, operable while the conveyors are dwelling at the transfer station, with a carrier in register with a box, for transferring the sheet and the assembly downwards through the aperture in the carrier and into the box. Preferably the apparatus includes mechanism for compacting the assembly of articles on the carrier to reduce its overall area prior to transfer of the sheet and assembly from the carrier to the box.

The apparatus according to the invention is primarily concerned with the packing of articles into rectangular boxes and in this case the recesses and apertures in the carriers will be rectangular and the assembly of articles placed in each carrier will normally also have a more or less rectangular outline. Compaction of the assembly is then conveniently performed by end and side rams which reduce the length and breadth of the assembly, the downward transfer of the assembly of articles into the box being performed by a top ram.

Figure 3:
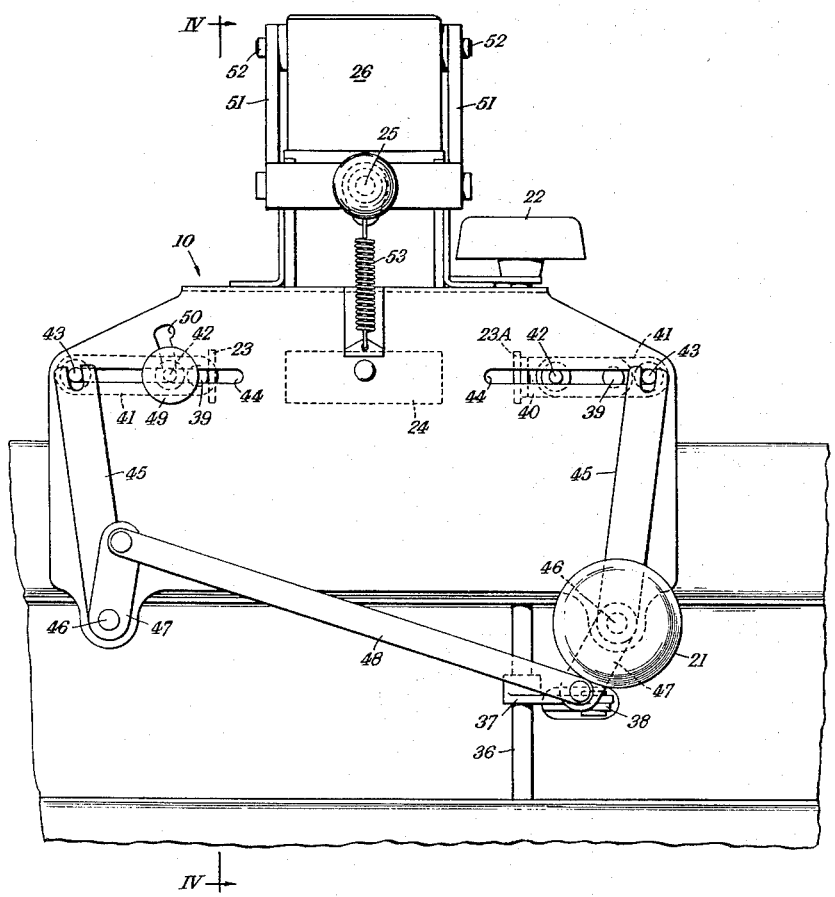
Figure 4:
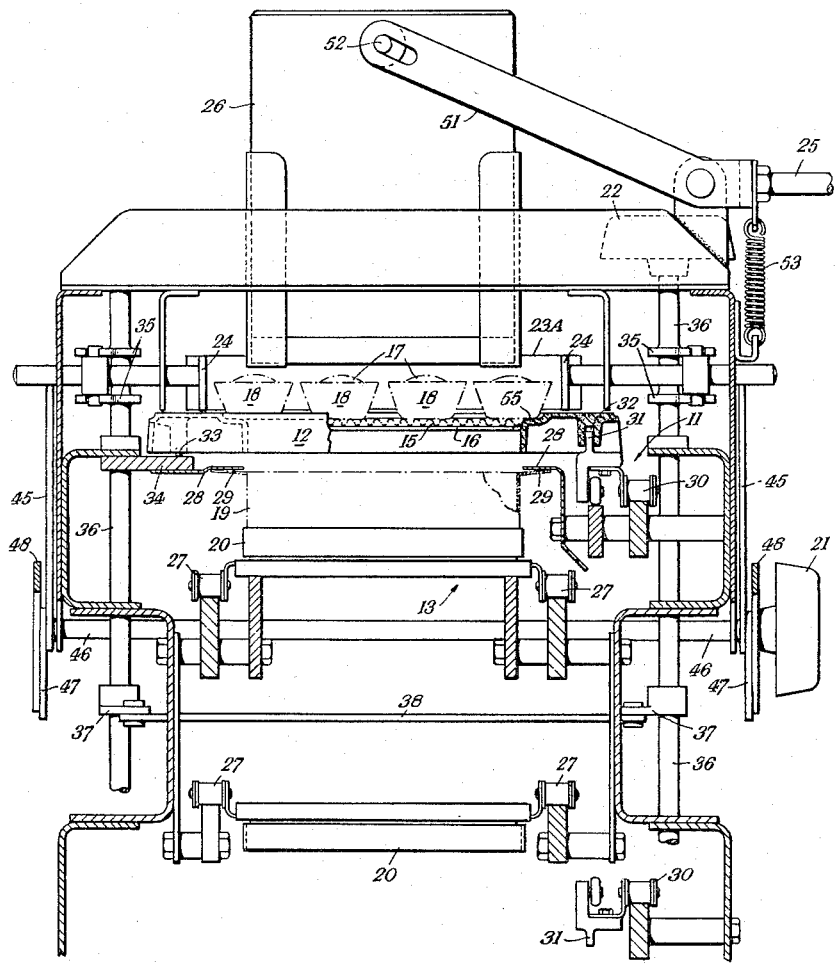

The invention will now be described in more detail, by way of example, with reference to the accompanying drawings, in which:

FIG. 1 is a diagrammatic plan view of the apparatus,
FIG. 2 is a plan view on a larger scale of the box filling machine,
FIG. 3 is a corresponding front elevation,
FIG. 4 is a section on the line IV—IV in FIG. 3,
FIGS. 5–7 are diagrams showing successive stages in the operation of the box filling machine,
FIG. 8 is a diagram showing a modification suitable for filling in succession two layers of articles into a box, and
FIG. 9 is a detail view showing an alternative method of attaching the carriers to their conveyor.

The apparatus shown in FIG. 1 includes a box filling machine 10, an upper conveyor 11 for feeding carriers 12 to the box filling machine and a lower conveyor 13 for feeding boxes 19 in succession to the box filling machine. Each carrier 12 has a pair of identical recesses 14, shown most clearly in FIGS. 5–7, and in the carrier shown removed from its conveyor in FIG. 1, having in the bottom thereof a throughgoing rectangular aperture.

In each of the recesses 14 in the carriers is placed a corrugated flat 15 of glassine paper, which is supported by strips 16 of rubber or like flexible material which extend inwardly from the longer sides of the apertures in the base of the recess. The articles to be packed are chocolates 17, each contained in a corrugated cup 18 of glassine paper. An assembly of twelve chocolate filled cups is placed on each carrier, above the glassine flat 15 in each of its recesses, as shown at the left hand side of FIG. 1. This may be done manually, but is preferably performed mechanically as described in our application Serial No. 819,186, filed June 9, 1959, now U.S. Patent No. 2,982,078. As will be seen the length and breadth of the assembly of filled cups as originally placed on the carrier 12 considerably exceed the length and breadth of the recess 14 and the flat 15 contained therein.

The carriers 12, after loading with glassine flats and assemblies of filled cups, are placed manually on the conveyor 11 and are registered therewith as later described. The boxes 19 are placed manually in trays 20, which serve to receive and locate the boxes supported on the conveyor 13. The conveyors 11 and 13 are driven intermittently by a Geneva gear or other suitable mechanism and are caused to dwell at each machine cycle with a flat 15 in a recess 14 on a carrier 12 in register in the box filling machine 10 with a box 19 beneath it. Compaction of the assembly of filled cups and downward transfer of the compacted assembly and the flat 15 into the box beneath them are then performed manually as later described in more detail. By actuating knobs 21, 22 respectively the operator first moves side rams 23, 23A and end rams 24 inwardly, from the position shown in FIG. 5 to that of FIG. 6, thereby compacting the assembly as indicated. The operator then actuates a handle 25 to cause downward movement of a top ram 26, as shown in FIG. 7, thereby causing the flat 15 and the assembly of filled cups supported thereon to be pushed downwardly into the box. As shown in FIG. 7, the rubber flaps 16 are deflected downwardly during this operation to allow the assembly and flat to pass downwardly through the aperture in the bottom of the recess 14 and they assist in guiding them into the box.

After passage through the box filling machine, the carriers 12 and filled boxes are removed manually from their respective conveyors as indicated at the right hand side of FIG. 1.

As will be appreciated, instead of providing for manual operation of the rams 23, 23A, 24 and 26 these may be operated mechanically under the control of cams on a cam shaft driven in timed relationship with the conveyors 11 and 13.

The box filling machine and the mode of support of the carriers and boxes on their respective conveyors are shown in more detail in FIGS. 3–5. As shown in FIG. 4, the box conveyor 13 consists of two chains 27 supporting the trays 20. Fixed guides 28 maintain the side flaps 29 of the boxes 19 open as the boxes pass beneath the box filling machine. The other conveyor 11 consists of a single chain 30 carrying a series of upstanding pegs 31, each for engaging a locating recess 32 at one side of a carrier 12. The carrier carries at its other side balls 33 which run on a fixed track 34. The carriers may, however, have any other suitable formations whereby they can be registered in relation to the conveyor 11. FIG. 4 also shows that portions of the outermost cups of the assembly rest, before compaction, on ledges 55 at the sides of the recess in the carrier. After compaction, these outermost cups are moved inwardly beyond the ledges so that they are wholly supported by the flat 15.

The end rams 24, as shown in FIG. 2, are actuated by levers 35 fixed to shafts 36, to which are also fixed arms 37 joined by a link 38. One of the shafts 36 carries the knob 22, and it will be clear that by turning the knob 22 the rams 24 may be simultaneously moved inwardly and outwardly as desired.

The side ram 23 is mounted directly on a rod 39 and the side ram 23A is supported by two brackets 40 on a similar rod 39. The ends of the rods 39 are attached to carriages 41 at front and rear of the machine. Each carriage has a pair of projecting pins 42, 43 which engage in horizontal slots 44 (FIG. 3) in the front and rear walls of the box filling machine. The pins 43 are longer than the pins 42 and are connected in pairs at front and rear of the machine by identical linkages. As shown most clearly in FIG. 3, each linkage consists of a pair of forked arms 45 engaging the pins 43 and fixed to a shaft 46, arms 47 fixed to the shafts 46 and a link 48 joining the arms 47. The knob 21 is fixed to the right hand shaft 46 at the front of the machine and, as will be clear from FIG. 3, rotation of the knob 21 will cause the rams 23, 23A to move simultaneously in and out as required.

After completion of the downward transfer of an assembly of filled cups to a box, all the rams are returned to their outward position prior to commencement of the next cycle of movement of the conveyors. These travel from left to right as seen in FIG. 1 and it is accordingly necessary for the side ram 23 to be lifted to the chain dotted position shown in FIG. 5, so that it will not foul the articles passing into position beneath the top ram 26. This is achieved by imparting manual upward movement to a knob 49 (FIG. 3) attached to the front pin 42 associated with the ram 23, so causing the left hand carriages 41 to pivot about the pins 43 and the pins 42 to travel up bayonet slots 50 in the front and rear walls of the box filling machine which retain the ram 23 in the raised position. The knob 49 is returned manually to the position shown in FIG. 3 before the knob 21 is actuated to move the rams 23, 23A inwardly.

As indicated in FIGS. 2 and 4, a forked portion 51 of the handle 25 engages pins 52 on opposite sides of the top ram 26 and a spring 53 normally maintains the top ram in its up position.

If it is desired to pack two layers of chocolate filled cups into each box, arrangements are made whereby, as shown in FIG. 8, two boxes 19 dwell in register in the box filling machine with the trailing recess 14 in one carrier and with the leading recess in the following carrier. The side and end rams are duplicated and the top ram has two plungers 126, 226; the longer plunger 126 operating at each cycle to deliver a layer of chocolate filled cups 18 and a flat 15 into the bottom of a box and the shorter plunger delivering an upper layer of filled cups 18 and a flat 15 into another box on top of the bottom layer deposited in that box during the preceding cycle.

If desired, the carriers 12 may be hinged to their conveyor chain 30 as indicated at 54 in FIG. 9. In this case the carriers are caused by suitable guiding means to move from a vertical position to a horizontal position as they approach the box filling machine and then to return to the vertical position. The conveyor supporting them is shorter than the box conveyor and by this hinging movement the carriers are prevented from fouling the boxes and the box conveyor.

What we claim as our invention and desire to secure by Letters Patent is:

1. Apparatus for packing into boxes or the like assemblies of articles to be packed, each of said assemblies resting on the upper surface of a flat sheet and said apparatus comprising carriers, each having a recess in its upper surface for the reception of said sheet and the assembly resting thereon, an aperture in the base of the recess and flexible leaves projecting inwardly from the periphery of the recess, said leaves serving to support the undersurface of said flat sheet and being capable of yielding to permit of downward passage of the sheet and the articles through the aperture, an intermittently operable conveyor for feeding said carriers in succession to a transfer station, another intermittently operable conveyor situated at a lower level for feeding boxes in succession to the transfer station, mechanism for compacting the assembly of articles on each carrier to reduce its overall area on arrival of said carrier at the transfer station, and mechanism, operable while the conveyors are dwelling at the transfer station with a carrier in register with a box, for transferring the sheet and the compacted assembly downwards through the aperture in the carrier and into the box.

2. Apparatus according to claim 1, in which the recesses and apertures in the carriers are rectangular and in which the compacting and transfer mechanism includes end and side rams for respectively reducing the length and breadth of the assembly of articles and a top ram for pushing the compacted assembly downwards from the carrier into the box.

3. Apparatus according to claim 2, wherein the compacting and transfer mechanism is duplicated and effective to transfer simultaneously two compacted assemblies into adjoining boxes, the top ram including two plungers, one longer than the other, which respectively transfer a bottom layer of articles to one box and a top layer of articles to the preceding box.

4. Apparatus according to claim 2, comprising means for displacing one of the side rams to the position in which it permits of unobstructed passage of the carriers into position beneath the top ram.

5. Apparatus according to claim 1, wherein the carriers are removable from their conveyor and have formations whereby they can be registered in relation to the conveyor.

6. Apparatus according to claim 1, wherein the carriers are hinged to their conveyor so that they may move from a vertical to a horizontal position as they approach the transfer station and afterwards back to a vertical position.

7. Apparatus according to claim 1, wherein the box conveyor is provided with trays for receiving and locating the boxes.

References Cited in the file of this patent

UNITED STATES PATENTS

| | | |
|---|---|---|
| 1,487,019 | Lopez | Mar. 18, 1924 |
| 1,588,156 | Anderson | June 8, 1926 |
| 1,869,457 | Benoit | Aug. 2, 1932 |
| 1,951,131 | Contos | Mar. 13, 1934 |
| 2,045,337 | Stone et al. | June 23, 1936 |
| 2,575,580 | Cadmus | Nov. 20, 1951 |
| 2,698,706 | Goepfert et al. | Jan. 4, 1955 |
| 2,886,927 | Fisk | May 19, 1959 |
| 2,909,016 | Sherrill | Oct. 20, 1959 |
| 2,921,425 | Seval | Jan. 19, 1960 |
| 2,930,172 | Pette et al. | Mar. 29, 1960 |
| 2,946,164 | Potts et al. | July 26, 1960 |